US009411443B2

(12) United States Patent
Dae

(10) Patent No.: US 9,411,443 B2
(45) Date of Patent: Aug. 9, 2016

(54) METHOD AND APPARATUS FOR PROVIDING A FUNCTION OF A MOUSE USING A TERMINAL INCLUDING A TOUCH SCREEN

(71) Applicant: Samsung Electronics Co., Ltd., Gyeonggi-do (KR)

(72) Inventor: Inki Dae, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 231 days.

(21) Appl. No.: 13/782,437

(22) Filed: Mar. 1, 2013

(65) Prior Publication Data
US 2014/0015747 A1 Jan. 16, 2014

(30) Foreign Application Priority Data
Jul. 12, 2012 (KR) .......................... 10-2012-0076123

(51) Int. Cl.
 G06F 3/033 (2013.01)
 G06F 3/041 (2006.01)
 G06F 3/0488 (2013.01)

(52) U.S. Cl.
 CPC ............ *G06F 3/041* (2013.01); *G06F 3/04883* (2013.01)

(58) Field of Classification Search
 CPC ....................................................... G06F 3/041
 USPC ......................................................... 345/157
 See application file for complete search history.

(56) References Cited

U.S. PATENT DOCUMENTS

| 6,515,687 | B1 * | 2/2003 | Wynn et al. .................... 715/840 |
| 7,519,223 | B2 * | 4/2009 | Dehlin .................. G06F 3/0354 345/173 |
| 8,289,316 | B1 * | 10/2012 | Reisman ............... G06F 3/0425 345/173 |
| 8,407,606 | B1 * | 3/2013 | Davidson .............. G06F 3/0488 345/173 |
| 2003/0052866 | A1 * | 3/2003 | Sakaguchi ..................... 345/173 |
| 2006/0026535 | A1 * | 2/2006 | Hotelling .............. G06F 3/0418 715/863 |
| 2008/0074389 | A1 * | 3/2008 | Beale ........................... 345/161 |
| 2009/0262090 | A1 * | 10/2009 | Oh .................................. 345/173 |
| 2010/0214221 | A1 * | 8/2010 | Lee et al. ...................... 345/163 |
| 2011/0074718 | A1 * | 3/2011 | Yeh et al. ...................... 345/173 |
| 2011/0291979 | A1 * | 12/2011 | Sahashi ......................... 345/173 |
| 2012/0054671 | A1 * | 3/2012 | Thompson et al. ........... 715/784 |
| 2012/0242581 | A1 * | 9/2012 | Laubach ............. G06F 3/04812 345/168 |

FOREIGN PATENT DOCUMENTS

| KR | 1020090093250 | 9/2009 |
| KR | 1020120000045 | 1/2012 |

* cited by examiner

*Primary Examiner* — Jason Olson
(74) *Attorney, Agent, or Firm* — The Farrell Law Firm, P.C.

(57) ABSTRACT

A method and an apparatus for providing a function of a mouse, using a terminal that includes a touch screen, are provided. A first touch input is received and the first touch input is set as a first reference touch input. A first function is performed, when a touch input is received in a first direction relative to the first reference touch input while the first reference touch input is being received. A second function is performed, when the touch input is received in a second direction, which is opposite the first direction, relative to the first reference touch input while the first reference touch input is being received.

13 Claims, 13 Drawing Sheets

FIG. 7
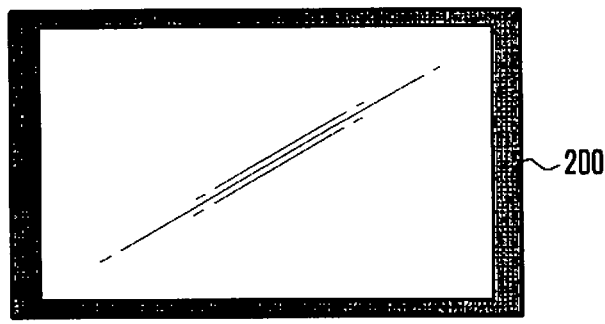
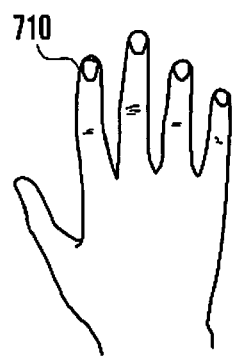
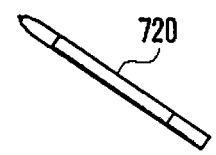

METHOD AND APPARATUS FOR PROVIDING A FUNCTION OF A MOUSE USING A TERMINAL INCLUDING A TOUCH SCREEN

PRIORITY

This application claims priority under 35 U.S.C. §119(a) to a Korean patent application filed on Jul. 12, 2012 in the Korean Intellectual Property Office and assigned Serial No. 10-2012-0076123, the entire disclosure of which is incorporated herein by reference.

BACKGROUND OF THE INVENTION

1. Field of the Invention

The present invention relates generally to a method and an apparatus for providing a function of a mouse using a terminal including a touch screen, and more particularly, to a method and an apparatus for providing a function of a mouse button and a mouse wheel using a touch screen.

2. Description of the Related Art

Various functions are performed by a terminal. Particularly, the development of the smart phone and the touch screen has accelerated developments of the terminal. A terminal may include an input apparatus capable of receiving a multi-touch, and movement of a mouse and a mouse button using this input apparatus may be implemented.

FIG. 1 is a diagram illustrating a conventional mouse apparatus. Generally, a mouse apparatus 100 includes a left button 110, a right button 120, and a wheel 130.

While the button and wheel of the mouse may be implemented using the input apparatus that is capable of receiving the multi-touch, it may not be intuitive for a user to use this technique.

SUMMARY OF THE INVENTION

The present invention has been made to address at least the above problems and/or disadvantages and to provide at least the advantages described below. Accordingly, an aspect of the present invention provides a method and an apparatus for enabling a user to use a function of a mouse button and a mouse wheel more conveniently and intuitively in a terminal that includes a touch screen.

In accordance with an aspect of the present invention, a method of providing a function of a mouse, using a terminal that includes a touch screen, is provided. A first touch input is received and the first touch input is set as a first reference touch input. A first function is performed, when a touch input is received in a first direction relative to the first reference touch input while the first reference touch input is being received. A second function is performed, when the touch input is received in a second direction, which is opposite the first direction, relative to the first reference touch input while the first reference touch input is being received.

In accordance with another aspect of the present invention, an apparatus for providing a function of a mouse, using a terminal that includes, a touch screen is provided. The terminal includes an input unit configured to receive a touch input. The terminal also includes a controller configured to receive a first touch input and set the first touch input as a first reference touch input, configured to perform a first function when the touch input is received in a first direction relative to the first reference touch input while the first reference touch input is being received, and configured to perform a second function when the touch input is received in a second direction, which is opposite to the first direction, relative to the first reference touch input while the first reference touch input is received.

BRIEF DESCRIPTION OF THE DRAWINGS

The above and other aspects, features and advantages of the present invention will be more apparent from the following detailed description when taken in conjunction with the accompanying drawings, in which:

FIG. 7 is a diagram illustrating a touch screen and an input means thereof, according to an embodiment of the present invention;

DETAILED DESCRIPTION OF EMBODIMENTS OF THE PRESENT INVENTION

Figure 1:
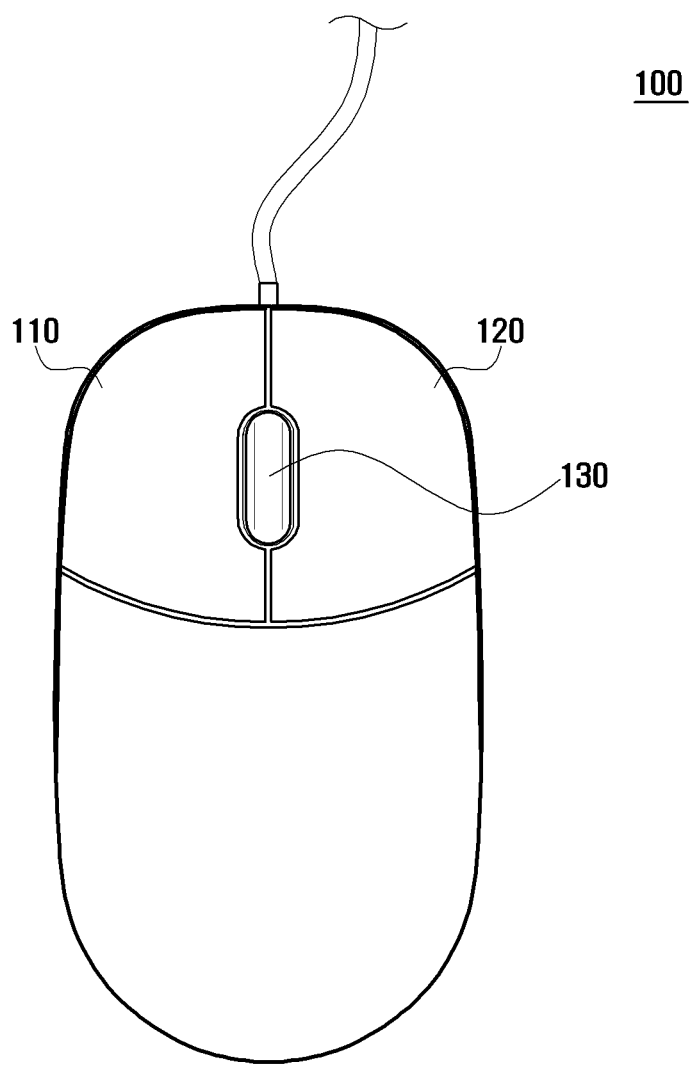
FIG. 1 is a diagram illustrating a conventional mouse apparatus.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

A terminal, according to an embodiment of the present invention, may include all types of general electronic terminals, such as, for example, a mobile communication terminal, a Personal Digital Assistant (PDA), a navigation terminal, a digital broadcast receiver, a Portable Multimedia Player (PMP), an MP3 player, a Personal Computer (PC), a laptop computer, and a tablet PC.

Figure 2:
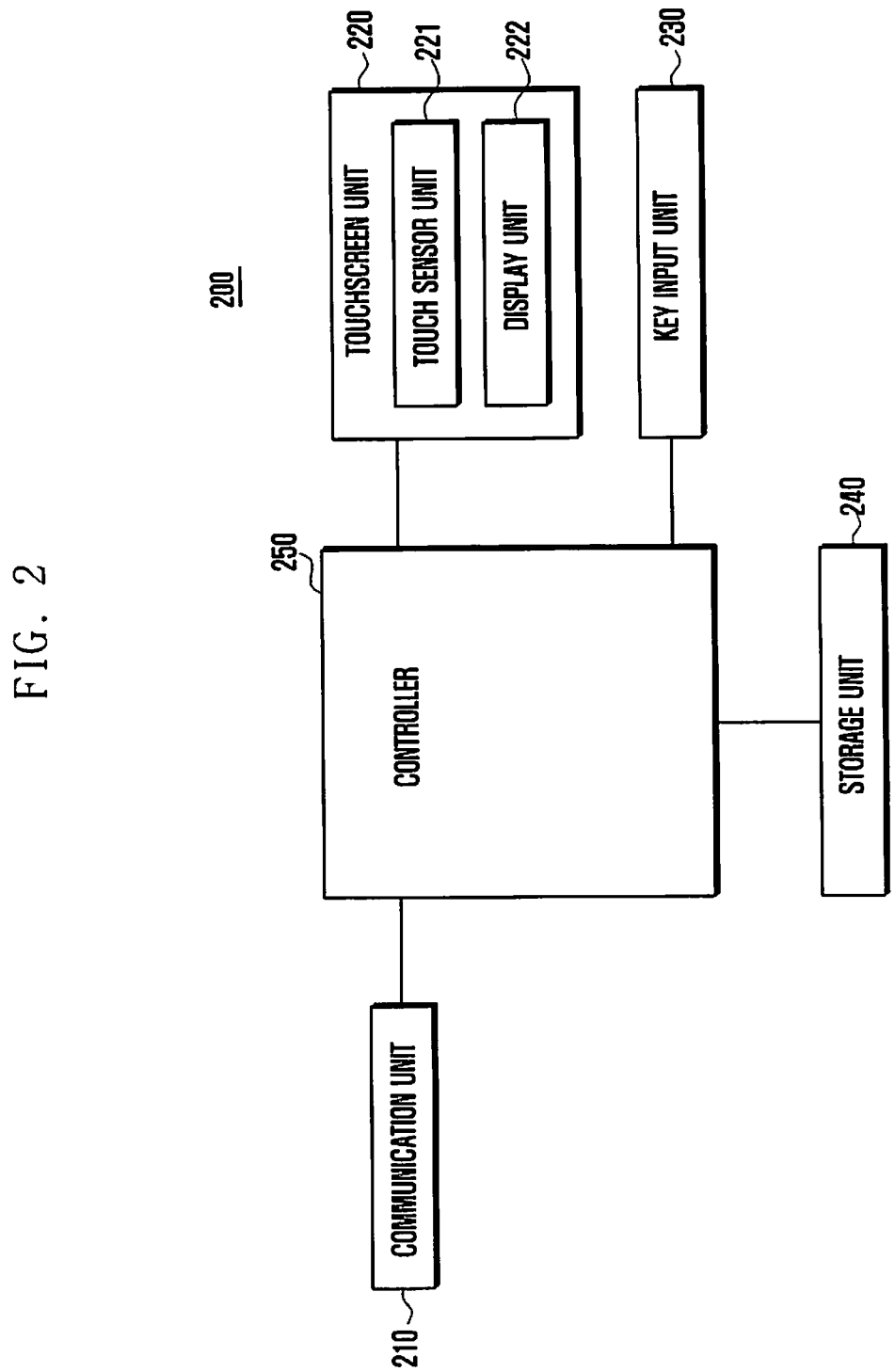
FIG. 2 is a block diagram illustrating an internal configuration of a terminal apparatus that includes a touch screen, according to an embodiment of the present invention.

FIG. 2 is a block diagram illustrating an internal configuration of a terminal apparatus including a touch screen, according to an embodiment of the present invention. A terminal 200, according to an embodiment of the present invention, includes a communication unit 210, a touch screen unit 220, a key input unit 230, a storage unit 240, and a controller 250.

The communication unit 210 includes both wired/wireless communication units and performs data transmission and reception between the terminal 200 and an external device. When the terminal 200 is wirelessly connected with the external device, the communication unit 210 operates as the wireless communication unit, and the communication unit 210 may include a Radio Frequency (RF) transmitter for performing frequency up conversion and amplification of a transmission signal and an RF receiver for performing low noise amplification and frequency down conversion of a received signal. Also, the communication unit 210 may be configured as a module capable of performing a short range communication such as Radio Frequency IDentification (RFID), and particularly, Near Field Communication (NFC), Bluetooth, UltraWideBand (UWB), Zigbee, and Infrared Data Association (IrDA). When the terminal 200 is wire connected, the communication unit 210 operates as the wire communication unit.

In an embodiment of the present invention, when the terminal performs a mouse function, the communication unit 210 may transmit a signal associated with a corresponding function to the external device.

The touch screen unit 220 includes a touch sensor unit 221 and a display unit 222. The touch sensor unit 221 is an element that detects a touch input from a user. The touch sensor unit 221 may be a capacitive overlay touch sensor or a resistive overlay touch sensor. It should be noted that, other than the above-described sensor, the touch sensor unit 221 of the present invention may be any type of a sensor that can detect a touch by an object. The touch sensor unit 221 detects the touch input from the user, generates a detection signal, and transmits the detection signal to the controller 250. The touch sensor unit 221 may detect generation, continuation, and termination of the touch input, which is generated individually, subsequently, or simultaneously. The controller 250 may control the display unit 222 to output information corresponding to the received detection signal.

The touch sensor unit 221 may be configured as a proximity sensor. When the touch sensor unit 221 is configured as the proximity sensor, the touch sensor unit 221 may detect an input signal, such as existence, approach, movement, direction, speed, or shape of an object on a detection surface without a mechanical contact by using a force in an electromagnetic field. The proximity sensor may be embodied as one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor.

Also, the touch sensor unit 221 may be configured to replace the touch sensor unit 221 and the proximity sensor and perform a function thereof by using an Electro Magnetic Resonance (EMR) pad.

Further, the touch sensor unit 221 may receive a manipulation signal according to the touch input of the user by various input tools. The touch sensor unit 221 may receive a manipulation signal by a user's hand or a physical tool, i.e., a pen input device, such as, for example, a stylus pen or a manipulation button that may be included in the stylus pen.

In an embodiment of the present invention, the touch sensor unit 221 may receive at least one of a touch input or a drag input from the user and receive an inversion signal. Examples of the terminal 200, including the touch sensor unit 221 and an input means thereof are shown in FIG. 7.

FIG. 7 is a diagram illustrating a touch screen and an input means thereof, according to an embodiment of the present invention.

In FIG. 7, the terminal 200, which includes the touch sensor unit 221, and the input means, which are a user's hand 710 and a pen input device 720, are shown. The input means is not limited to the user's hand 710 and the pen input device 720, but may be all kinds of means that can be detected by the touch sensor unit 221.

Referring back to FIG. 2, the display unit 222 may be formed as a Liquid Crystal Display (LCD), an Organic Light Emitting Diode (OLED), or an Active Matrix Organic Light Emitting Diode (AMOLED), and visually provides data stored in the terminal 200 or inputted data to the user according to control of the controller 250.

The key input unit 230 is an input device formed in an area other than the touch screen unit 220 in the terminal 200, and performs a function to generate and transmit an input signal to the controller 250, similar to the touch sensor unit 221. The key input unit 230 may detect generation, continuation, and termination of an input, which is generated individually, subsequently, or simultaneously. The key input unit 230 may be configured as a key pad including a number key and an arrow key, and may be configured as individual keys. The key input unit 230 may be formed in a button type or a touch sensor type. In the case of a portable terminal, which can be manipulated by the touch screen 220 according to an embodiment of the present invention, the key input unit 230 may be omitted.

In an embodiment of the present invention, the key input unit 230 may receive the inversion signal from the user.

The storage unit 240 is an element that stores a program and data required for operating the terminal 200, and may store an Operating System (OS) for booting the terminal 200, an application, and data, such as, for example, an image, audio, or video. The storage unit 240 may be configured as a storage medium such as, for example, a flash type memory, a hard disk type memory, a multimedia card micro type memory, a card type memory (e.g., SD memory, XD memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The controller 250 is an element that controls an overall operation of the terminal 200. The controller 250 controls an overall operation in a process of providing the mouse function by the terminal 200.

The controller may receive the touch input from the user through the touch sensor unit 221 of the touch screen 220. For example, the user may touch a finger on the touch sensor unit 221 and move the finger, thereby moving a mouse cursor. An example of this gesture is shown in FIG. 8.

Figure 8:
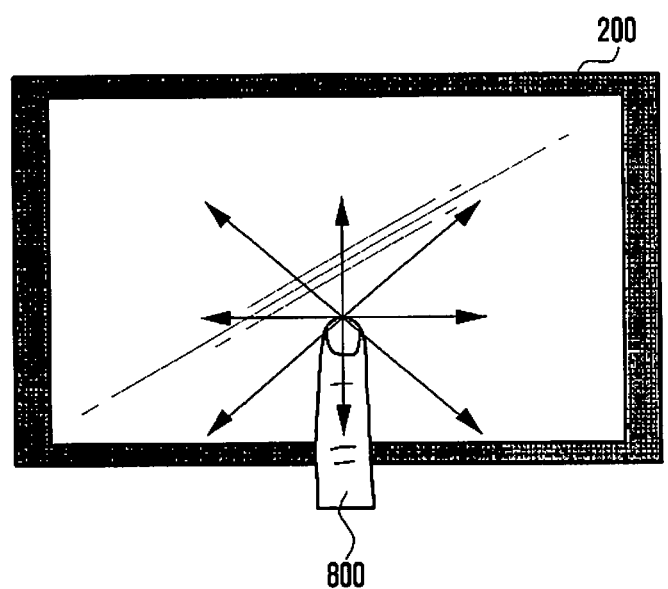
FIG. 8 is a diagram illustrating a method of manipulating a cursor in a terminal.

FIG. 8 is a diagram illustrating a method of manipulating a cursor in a terminal. The user may touch a finger 800 on the touch screen 220 of the terminal 200 and move the finger, thereby moving the mouse cursor.

In an embodiment of the present invention, the controller 250 may receive a first touch input from the user through the touch sensor unit 221 of the touch screen 220 and set the first touch input as a first reference touch input. In a state where the first reference touch input is being received, when the touch input is received in a first direction relative to the first reference touch input, the controller 250 may perform a first function. Also, in the state where the first reference touch input is being received, when the touch input is received in a second direction, which is opposite to the first direction, the controller 250 may perform a second function.

According to an embodiment of the present invention, the first direction may be a left direction relative to a coordinate of the first reference touch input, the first function may be a function corresponding to an operation of clicking a left button of the mouse, the second direction may be the opposite direction of the first direction, i.e., a right direction relative to the coordinate of the first reference touch input, and the second function may be a function corresponding to an operation of clicking a right button of the mouse.

In this case, in a detailed operation of the terminal 200, when the controller 250 receives the first touch input and sets the first touch input as the first reference touch input, the controller 250 may calculate the coordinate of the first reference touch input. When another touch input is received while the first reference touch input is being received, the controller 250 may determine whether another touch input is received on a left side or a right side with respect to the coordinate of the first reference touch input. Namely, on the touch screen 220 which is a plane, when the coordinate of the first reference touch input is defined as an origin, it may be determined whether another touch input is received on a left side or a right side with respect to a y-axis of the coordinate of the first reference touch input. The state in which the first reference touch input is being received means that the touch input is continued, e.g., the user continues to touch the touch screen 220 with a hand.

Further, the first touch input may not be a single touch input but a continuous touch input. Specifically, when the user performs a gesture of contacting the finger on the touch screen 220 and moving the finger, thereby moving the mouse cursor, a contact point that moves according to the finger may correspond to the first touch input. In this case, the first reference touch input may not have a fixed coordinate but a continually changing coordinate.

Therefore, when another touch input is received on a left side with respect to the first reference touch input through the touch sensor unit 221, the controller 250 may perform a function corresponding to the operation of clicking the left button of the mouse. Also, when another touch input is received on a right side with respect to the first reference touch input through the touch sensor unit 221, the controller 250 may perform a function corresponding to the operation of clicking the right button of the mouse.

Figure 9:
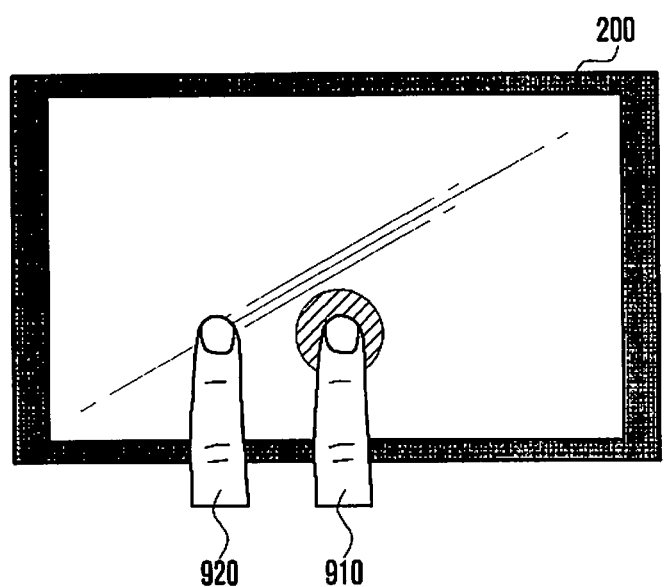
FIG. 9 is a diagram illustrating a method of inputting a mouse button clicking operation, according to an embodiment of the present invention.

FIG. 9 is a diagram illustrating a method of inputting a mouse button clicking operation, according to an embodiment of the present invention.

Referring to FIG. 9, the terminal 200 first sets a first reference touch input 910 through the first touch input and, in a state where the first reference touch input 910 is being received, the terminal 200 receives another touch input 920 on the left side of the first reference touch input 910. Since another touch input 920 is received on the left side of the first reference touch input 910, a function corresponding to the operation of clicking the left button of the mouse is performed.

Figure 10:
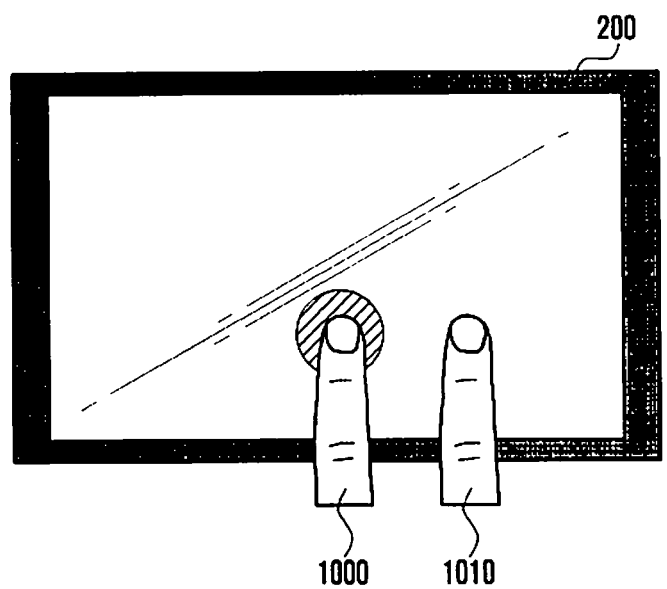
FIG. 10 is a diagram illustrating a method of inputting a mouse button clicking operation, according to another embodiment of the present invention.

FIG. 10 is a diagram illustrating a method of inputting a mouse button clicking operation, according to another embodiment of the present invention.

Referring to FIG. 10, the terminal 200 first sets a first reference touch input 1000 through the first touch input and, in a state where the first reference touch input 1000 is being received, the terminal 200 receives another touch input 1010 on the right side of the first reference touch input 1000. Since another touch input 1010 is received on the right side of the first reference touch input 1000, a function corresponding to the operation of clicking the right button of the mouse is performed.

Embodiments of the present invention are not limited to the above described embodiment. For example, after the first reference touch input is received, another touch input may be inputted not one time but multiple times, and another touch input may not be a single touch input but multiple touch inputs, and the multiple touch inputs may be entered multiple times. Also, in a recent mouse device, an additional button for performing an additional function such as, for example, going back to a previous page during a web surfing, may be included in addition to the left button and the right button. The first function and the second function may not be limited to a function corresponding to operations of clicking the left and right buttons of the mouse, and may correspond to the additional function.

As described above, the user may perform the function corresponding to the operation of clicking the left button or the right button of the mouse through two touch actions conveniently, easily, and intuitively, without a need for entering a touch input in a particular area.

Referring back to FIG. 2, the controller 250 of embodiments of the present invention may receive the inversion signal from the user through the touch sensor unit 221 or the key input unit 230. The inversion signal is a signal that sets a function corresponding to the touch input received in the first direction or the second direction respectively to the second function or the first function, not the first function or the second function. Specifically, as described above, prior to receiving the inversion signal, when the controller 250 receives another touch input on the left side with respect to the first reference touch input, the controller 250 performs the function corresponding to the operation of clicking the left button of the mouse. When the controller 250 receives another touch input on the right side with respect to the first reference touch input, the controller 250 performs the function corresponding to the operation of clicking the right button of the mouse. In comparison, when the inversion signal is received, and the controller 250 receives another touch input on the left side with respect to the first reference touch input, the controller 250 performs the function corresponding to the operation of clicking the right button of the mouse, and when the controller 250 receives another touch input on the right side with respect to the first reference touch input, the controller 250 performs the function corresponding to the operation of clicking the left button of the mouse.

Thus, switching a function corresponding to each direction, according to an input of the inversion signal, is for a left-handed user. The left-handed user may use the mouse function more easily and conveniently by inputting the inversion signal through the touch sensor unit 221 or the key input unit 230.

Further, when setting the first reference touch input, the controller 250 of the present invention determines whether the second touch input is received, and when the second touch input is received, the controller 250 may set the first touch input and the second touch input as the second reference touch input. Thus, the second reference touch input has two contact points by including the second touch input in addition to the first touch input.

When the second reference touch input is being received and a drag input is received between the first touch input and the second touch input in a third direction which is perpendicular to the first direction and the second direction, the controller 250 may perform a third function corresponding thereto. In a detailed operation of the terminal 200, when receiving and setting the first touch input and the second touch input as the second reference touch input, the controller 250 may calculate coordinates of the first touch input and the second touch input, respectively. When the second reference touch input is being received and another touch input is received, the controller 250 may determine whether another touch input is received in the left side or the right side between the coordinates of the first touch input and the second touch input. Specifically, in the touch screen 220, which is a plane, whether another touch input is received between a y-coordinate of the first touch input and a y-coordinate of the second touch input may be determined. A state in which the second reference touch input is being received means that the touch input is continued, e.g., the user continues to touch the touch screen 220 with a hand. Likewise, the first touch input may be a continuous touch input, not a single touch input.

The third direction may be an upward or a downward direction. Specifically, when the first direction or the second direction is the left or the right direction, the third direction may be the upward or the downward direction, which is perpendicular to the left or the right direction. In other words, the third direction is a direction perpendicular to a line connecting the coordinate of the first touch input and the coordinate of the second touch input on the touch screen 220, which is a plane. Also, the third function of the present invention may be a function corresponding to an operation of rotating a mouse wheel.

Therefore, when the drag input, which moves upwardly between the coordinate of the first touch input and the coordinate of the second touch input is received through the touch sensor unit 221, the controller 250 may perform a function corresponding to an operation of rotating the mouse wheel upwardly, and when the drag input which moves downwardly is received, the controller 250 may perform a function corresponding to an operation of rotating the mouse wheel downwardly. An example of such an operation is shown in FIG. 11.

Figure 11:
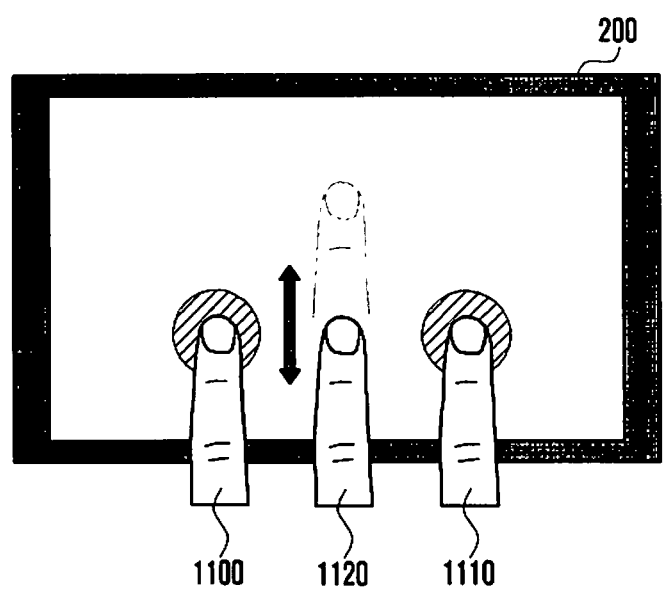
FIG. 11 is a diagram illustrating a method of inputting a mouse wheel rotating operation, according to an embodiment of the present invention.

FIG. 11 is a diagram illustrating a method of inputting a mouse wheel rotating operation, according to an embodiment of the present invention.

Referring to FIG. 11, the terminal 200 receives two touch inputs, sets the two touch inputs as second reference touch inputs 1100, 1110, and receives a drag input 1120 between the second reference touch inputs 1100, 1110. According to a direction of the drag input 1120, when the drag input, which moves upwardly, is received, the function corresponding to the operation of rotating the mouse wheel upwardly is performed. When the drag input, which moves downwardly is received, the function corresponding to the operation of rotating the mouse wheel downwardly is performed.

The controller 250 may distinguish the second touch input which constitutes the second reference touch input with a touch input for performing the first function or the second function, i.e., a touch input for performing the operation of clicking the left or the right button of the mouse. For example, when the controller 250 receives the first touch input to set the first touch input as the first reference touch input, and when an additional touch input is received, in case where the additional touch input is a continuous touch input, i.e., a touch state is maintained, the controller 250 recognizes the additional touch input as the second touch input and sets the first touch input and the second touch input as the second reference touch input. When the additional touch input is a non-continuous touch input, i.e., a touch is released after one time touch, the controller 250 may determine the additional touch input as a touch input for performing the operation of clicking the left or the right button of the mouse. However, a method of distinguishing the touch input is not limited to this embodiment of the present invention.

When the second reference touch input is being received and a touch input is received between the first touch input and the second touch input, the controller 250 may perform a fourth function. The fourth function may be a function corresponding to an operation of clicking the mouse wheel.

Therefore, when the touch input between the coordinate of the first touch input and the coordinate of the second touch input is received through the touch sensor unit 221, the controller 250 may perform the function corresponding to the operation of clicking the mouse wheel. An example of such operation is shown in FIG. 12.

Figure 12:
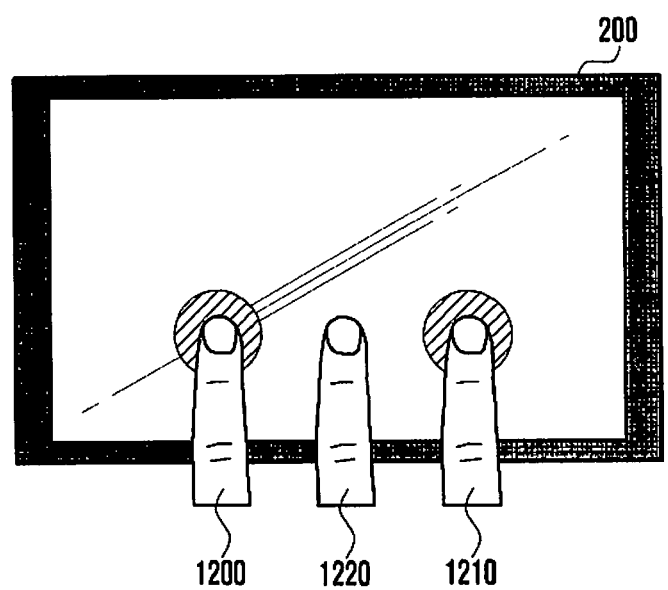
FIG. 12 is a diagram illustrating a method of inputting a mouse wheel clicking operation, according to an embodiment of the present invention.

FIG. 12 is a diagram illustrating a method of inputting a mouse wheel clicking operation, according to an embodiment of the present invention.

Referring to FIG. 12, the terminal 200 receives two touch inputs, sets the two touch inputs as second reference touch inputs 1200, 1210, and receives a touch input 1220 between the second reference touch inputs 1200, 1210. The terminal 200 may perform the function corresponding to the operation of clicking the mouse wheel.

As described above, the user may perform the function corresponding to the operation of rotating the mouse wheel easily, conveniently, and intuitively through two touches and one drag. Also, the user may perform the function corresponding to the operation of clicking the mouse wheel easily, conveniently, and intuitively through three touches.

The controller 250, of embodiments of the present invention, may connect the terminal 200 to the external device through the communication unit 210. The controller 250 may connect the terminal 200 to the external device prior to setting the first reference touch input and, when performing one or more functions among the first function, the second function, the third function, or the fourth function corresponding to a user input, the controller 250 may transmit a signal associated with a corresponding function to the external device. An example of such process is shown in FIG. 13.

Figure 13:
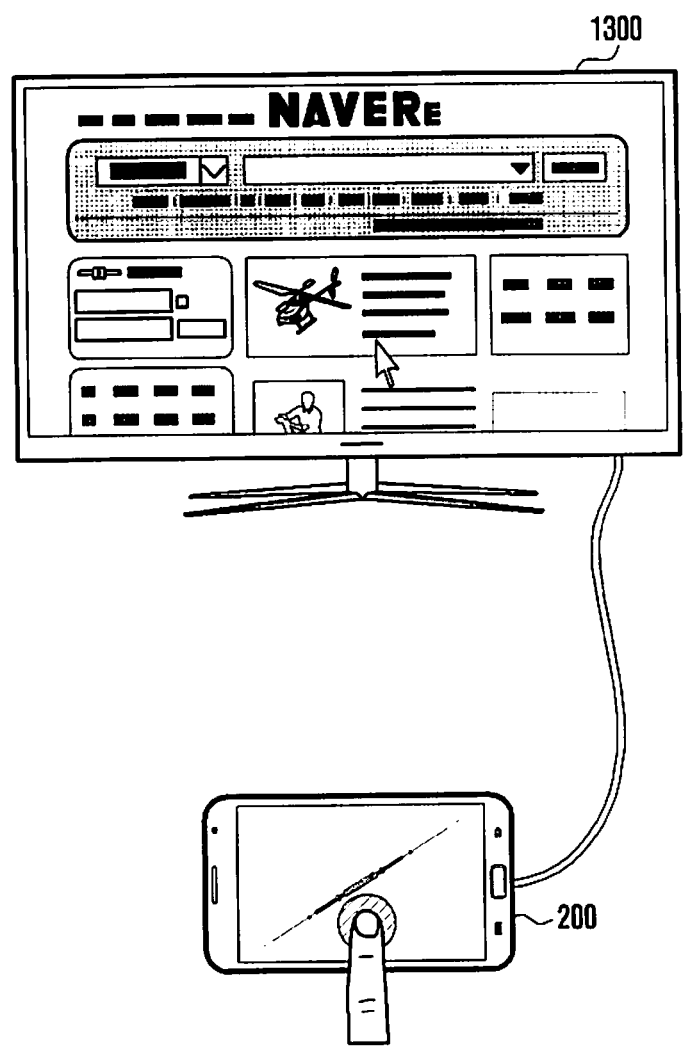
FIG. 13 is a diagram illustrating a method of using a terminal connected to an external device, according to an embodiment of the present invention.

FIG. 13 is a diagram illustrating a method of using a terminal connected to an external device, according to an embodiment of the present invention. In FIG. 13, the terminal 200 is connected to a TV 1300, which is the external device. The user may perform, for example, web surfing by using the TV 1300 through the terminal 200 connected with the TV 1300.

As described above, the user may control the external device easily and conveniently by using the terminal 200 as the mouse.

In the above-described embodiment, the internal configuration of the terminal 200 is described. Hereinafter, a method of providing a mouse function of the terminal 200 is described.

Figure 3:
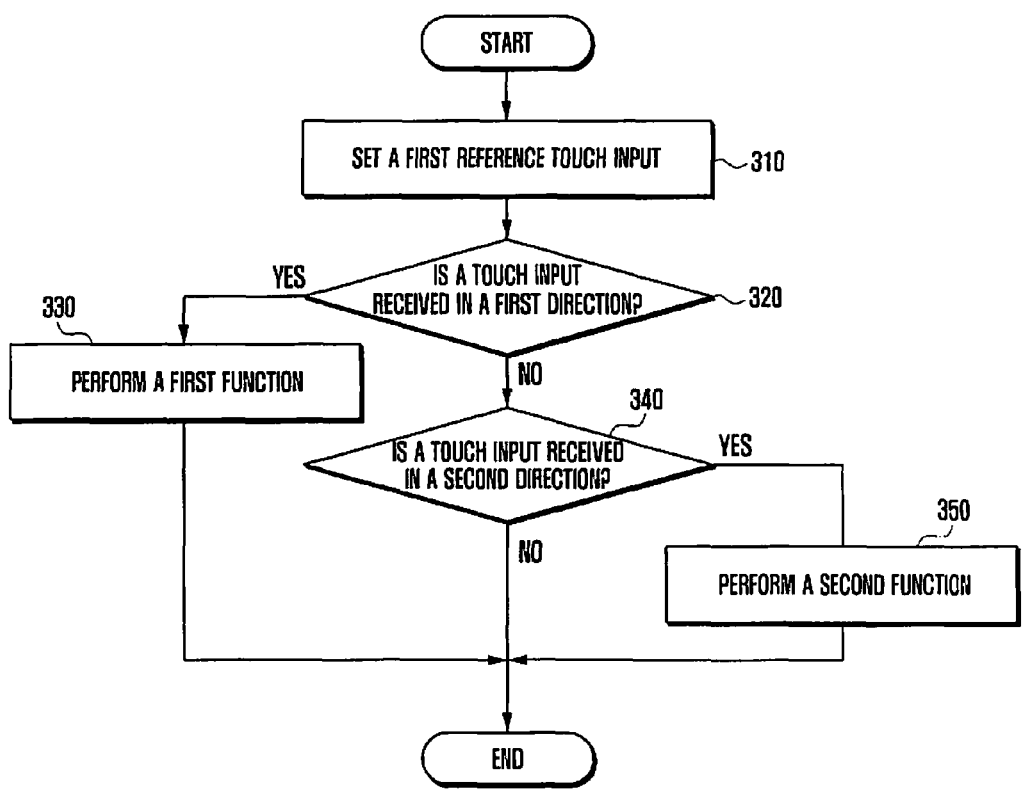
FIG. 3 is a flow chart illustrating a method of providing a mouse function using a terminal that includes a touch screen, according to an embodiment of the present invention.

FIG. 3 is a flow chart illustrating a method of providing a mouse function using a terminal including a touch screen, according to an embodiment of the present invention.

The controller 250 receives the first touch input from the user through the touch sensor unit 221 and sets the first touch input as the first reference touch input, in step 310. The controller 250 determines whether a touch input is received in the first direction with respect to the first reference touch input while the first reference touch input is being received, in step 320. The state in which the first reference touch input is being received means that the touch input is continued, e.g., the user continues to touch the touch screen 220 with a hand.

When the controller 250 determines that the touch input is received in the first direction with respect to the first reference touch input while the first reference touch input is being received, the controller 250 performs the first function, in step 330.

When the controller 250 determines that touch input is not received in the first direction with respect to the first reference touch input while the first reference touch input is being received, the controller 250 determines whether a touch input is received in the second direction which is opposite to the first direction while the first reference touch input is being received, in step 340. When the controller 250 determines that the touch input is received in the second direction while the first reference touch input is being received, the controller 250 performs the second function, in step 350.

According to an embodiment of the present invention, the first direction may be the left direction relative to the first reference touch input coordinate, the first function may be the function corresponding to the operation of clicking the left button of the mouse, the second direction may be the opposite direction of the first direction, i.e., the right direction relative to the coordinate of the first reference touch input, and the second function may be the function corresponding to the operation of clicking the right button of the mouse.

In a detailed operation of the terminal 200, when the first touch input is received and set as the first reference touch input, the controller 250 may calculate the coordinate of the first reference touch input. When another touch input is received while the first reference touch input is being received, the controller 250 may determine whether another touch input is received in the left side or the right side with respect to the coordinate of the first reference touch input. Namely, on the touch screen 220, which is a plane, when the coordinate of the first reference touch input is defined as the origin, it may be determined whether another touch input is received on the left side or the right side with respect to a y-axis of the coordinate of the first reference touch input.

Further, the first touch input may not be a single touch input but a continuous touch input. Specifically, when the user performs a gesture of contacting the finger on the touch screen 220 and moving the finger, thereby moving the mouse cursor, a contact point that moves according to the finger may correspond to the first touch input. In this case, the first reference touch input may not have a fixed coordinate, but a continually changing coordinate.

Therefore, when another touch input is received on the left side with respect to the first reference touch input through the touch sensor unit 221, the controller 250 may perform the function corresponding to the operation of clicking the left button of the mouse. Also, when another touch input is received on the right side with respect to the first reference touch input through the touch sensor unit 221, the controller 250 may perform the function corresponding to the operation of clicking the right button of the mouse.

Examples of the above-described operations are described with respect to FIGS. 9 and 10.

FIG. 9 is a diagram illustrating a method of inputting a mouse button clicking operation, according to an embodiment of the present invention.

Referring to FIG. 9, the terminal 200 first sets the first reference touch input 910 through the first touch input and, in the state where the first reference touch input 910 is being received, the terminal 200 receives another touch input 920 on the left side of the first reference touch input 910. Since another touch input 920 is received on the left side of the first reference touch input 910, the function corresponding to the operation of clicking the left button of the mouse is performed.

FIG. 10 is a diagram illustrating a method of inputting a mouse button clicking operation, according to another embodiment of the present invention.

Referring to FIG. 10, the terminal 200 first sets the first reference touch input 1000 through the first touch input and, in the state where the first reference touch input 1000 is being received, the terminal 200 receives another touch input 1010 on the right side of the first reference touch input 1000. Since another touch input 1010 is received on the right side of the first reference touch input 1000, a function corresponding to the operation of clicking the right button of the mouse is performed.

Embodiments of the present invention are not limited to the above-described embodiments. For example, after the first reference touch input is received, another touch input may be inputted multiple times, and another touch input may not be a single touch input but multiple touch inputs, and the multiple touch inputs may be entered multiple times. Also, in a recent mouse device, an additional button for performing an additional function such as, for example, going back to a previous page during a web surfing, may be included in addition to the left button and the right button. The first function and the second function may not be limited to a function corresponding to operations of clicking the left and right buttons of the mouse and may correspond to the additional function.

When the controller 250 determines that the touch input is not received in the second direction in a state where the first reference touch input is being received at step 340, the controller 250 terminates an operation.

As described above, the user may perform the function corresponding to the operation of clicking the left button or the right button of the mouse through two touch actions conveniently, easily, and intuitively, without a need for entering a touch input in a particular area.

Figure 4:
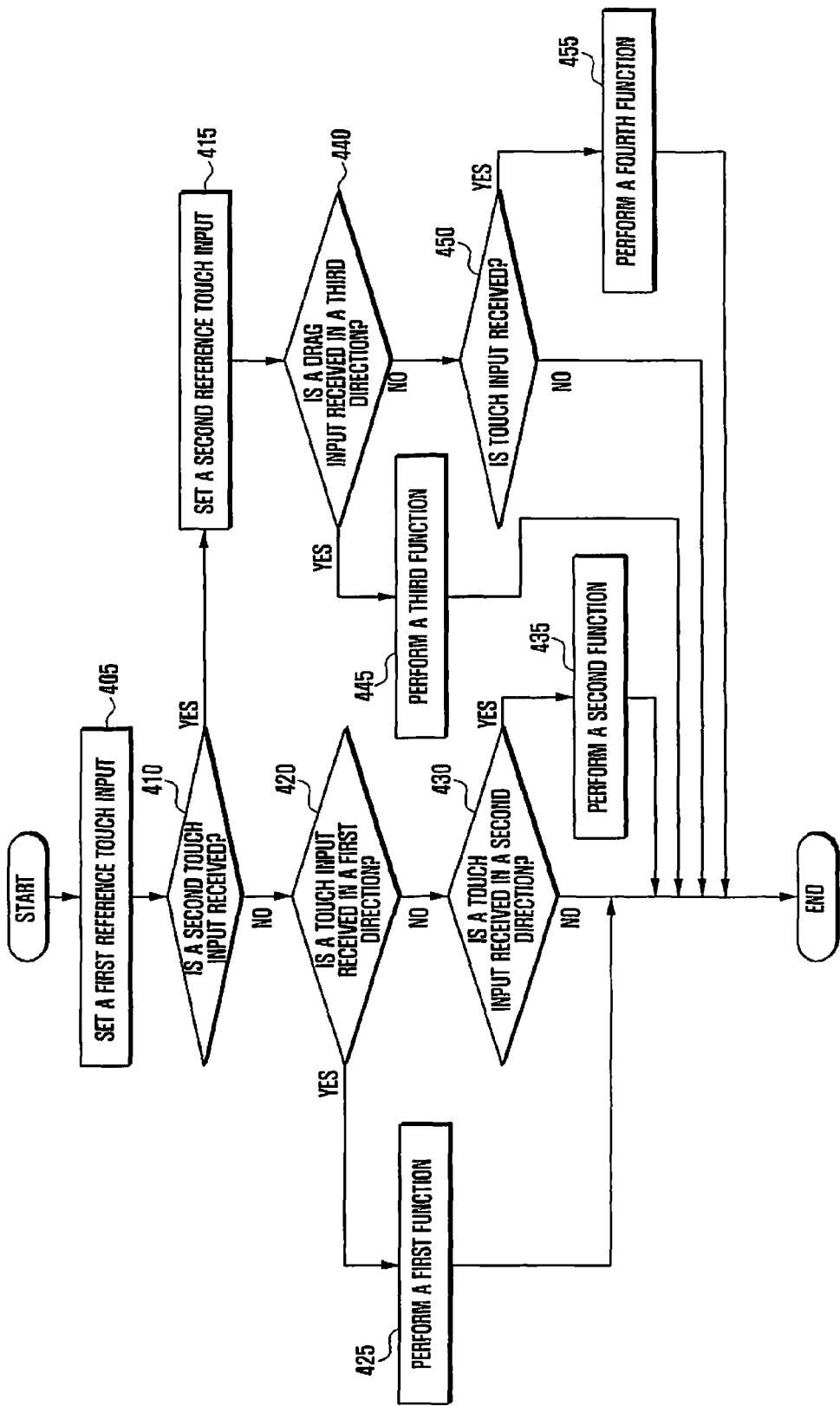
FIG. 4 is a flow chart illustrating a method of providing a mouse function using a terminal that includes a touch screen, according to another embodiment of the present invention.

FIG. 4 is a flow chart illustrating a method of providing a mouse function using a terminal including a touch screen, according to another embodiment of the present invention.

The controller 250 receives the first touch input from the user through the touch sensor unit 221 and sets the first touch input as the first reference touch input, in step 405. The controller 250 determines whether the second touch input is received, in step 410. When the controller 250 determines that the second reference touch input is not received at step 410, the controller 250 operates in the same manner as the embodiment of FIG. 3. Specifically, the controller 250 proceeds to step 420 to determine whether a touch input is received in a first direction. If the controller 250 determines that the touch input is received in the first direction relative to the first reference touch input while the first reference touch input is being received, the controller 250 performs the first function, in step 425. If the controller 250 determines that the touch input is not received in the first direction relative to the first reference touch input while the first reference touch input is being received at step 420, the controller 250 determines whether the touch input is received in the second direction which is opposite to the first direction while the first reference touch input is being received, in step 430. If the controller 250 determines that the touch input is received in the second direction while the first reference touch input is being received, the controller 250 performs the second function, in step 435. If the controller 250 determines that the touch input is not received in the second direction while the first reference touch input is being received, the controller 250 terminates an operation.

When it is determined that the second touch input is received at step 410, the controller sets the second reference touch input, in step 415. The second reference touch input has two contact points by including the second touch input in addition to the first touch input.

The controller 250 determines whether a drag input is received between the first touch input and the second touch input in the third direction, which is perpendicular to the first direction and the second direction while the second reference touch input is being received, in step 440. When the controller 250 determines that the drag input is received in the third direction at step 440, the controller 250 performs the third function, in step 445.

In a detailed operation of the terminal 200, when the controller 250 receives the first touch input and the second touch input and sets the first touch input and the second touch input as the second reference touch input, the controller 250 may calculate the coordinates of the first touch input and the second touch input, respectively. When another touch input is received while the second reference touch input is being received, the controller 250 may determine whether another touch input is received at the left side or the right side between the coordinates of the first touch input and the second touch input. Specifically, in the touch screen 220, which is a plane, whether another touch input is received between the y-coordinate of the first touch input and the y-coordinate of the second touch input may be determined. The state in which the second reference touch input is being received means that the touch input is continued, e.g., the user continues to touch the touch screen 220 with a hand. Likewise, the first touch input may be a continuous touch input, not a single touch input.

The third direction may be an upward or a downward direction. In other words, when the first direction or the second direction is the left or the right direction, the third direction may be the upward or the downward direction, which is perpendicular to the left or the right direction. Specifically, the third direction is a direction perpendicular to a line connecting the coordinate of the first touch input and the coordinate of the second touch input on the touch screen 220, which is a plane. Also, the third function of an embodiment of the present invention may be the function corresponding to the operation of rotating the mouse wheel.

Therefore, when the drag input which moves upwardly between the coordinate of the first touch input and the coordinate of the second touch input is received through the touch sensor unit 221, the controller 250 may perform the function corresponding to the operation of rotating the mouse wheel upwardly, and when the drag input which moves downwardly is received, the controller 250 may perform the function corresponding to the operation of rotating the mouse wheel downwardly. An example of such operation is shown in FIG. 11.

FIG. 11 is a diagram illustrating a method of inputting a mouse wheel rotating operation, according to an embodiment of the present invention.

Referring to FIG. 11, the terminal 200 receives two touch inputs, sets the two touch inputs as the second reference touch inputs 1100, 1110, and receives the drag input 1120 between the second reference touch inputs 1100, 1110. According to a direction of the drag input 1120, when the drag input which moves upwardly is received, the function corresponding to the operation of rotating the mouse wheel upwardly is performed, and when the drag input which moves downwardly is received, the function corresponding to the operation of rotating the mouse wheel downwardly is performed.

The controller 250 may distinguish the second touch input which constitutes the second reference touch input with a touch input for performing the first function or the second function, i.e., a touch input for performing the operation of clicking the left or the right button of the mouse. For example, when the controller 250 receives the first touch input to set the first touch input as the first reference touch input and when an additional touch input is received, in case where the additional touch input is a continuous touch input, i.e., a touch state is maintained, the controller 250 recognizes the additional touch input as the second touch input and sets the first touch input and the second touch input as the second reference touch input. When the additional touch input is a non-continuous touch input, i.e., a touch is released after one time touch, the controller 250 may determine the additional touch input as a touch input for performing the operation of clicking the left or the right button of the mouse. However, a method of distinguishing the touch input may not be limited to this example but have various applications.

Referring back to FIG. 4, when the controller 250 determines that a drag input is not received in the third direction at step 440, the controller 250 determines whether a touch input is received between the first touch input and the second touch input while the second reference touch input is being received, in step 450. When the controller 250 determines that the touch input is received at step 450, the controller 250 performs a fourth function, in step 455. The fourth function may be the function corresponding to the operation of clicking the mouse wheel.

Therefore, when the touch input between the coordinate of the first touch input and the coordinate of the second touch input is received through the touch sensor unit 221, the controller 250 may perform the function corresponding to the operation of clicking the mouse wheel. An example of such operation is shown in FIG. 12.

FIG. 12 is a diagram illustrating a method of inputting a mouse wheel clicking operation according to an embodiment of the present invention.

Referring to FIG. 12, the terminal 200 receives two touch inputs, sets the two touch inputs as the second reference touch inputs 1200, 1210, and receives the touch input 1220 between the second reference touch inputs 1200, 1210. The terminal 200 may perform the function corresponding to the operation of clicking the mouse wheel.

When the controller 250 determines that the touch input is not received in a state where the second reference touch input is being received at step 450, the controller 250 terminates an operation.

As described above, the user may perform the function corresponding to the operation of rotating the mouse wheel easily, conveniently, and intuitively through two touches and one drag. Also, the user may perform the function corresponding to the operation of clicking the mouse wheel easily, conveniently, and intuitively through three touches.

Figure 5:
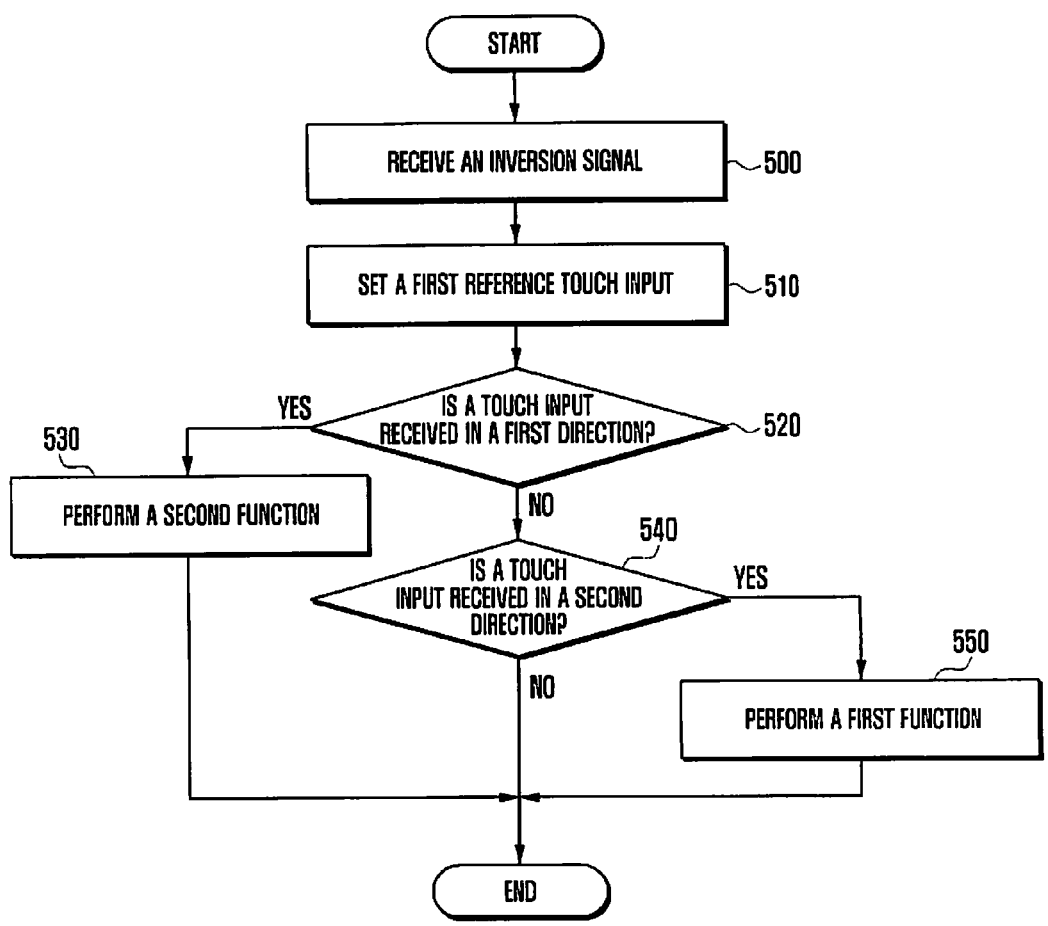
FIG. 5 is a flow chart illustrating a method of providing a mouse function using a terminal that includes a touch screen, according to an additional embodiment of the present invention.

FIG. 5 is a flow chart illustrating a method of providing a mouse function using a terminal that includes a touch screen, according to another embodiment of the present invention.

The controller 250 of the present invention receives the inversion signal, in step 500. The controller 250 may receive the inversion signal from the user through the touch sensor unit 221 or the key input unit 230. The inversion signal is a signal that sets a function corresponding to the touch input received in the first direction or the second direction respectively to the second function or the first function, not the first function or the second function. Specifically, as described above, prior to receiving the inversion signal, when the controller 250 receives another touch input on the left side with respect to the first reference touch input, the controller 250 performs the function corresponding to the operation of clicking the left button of the mouse, and when the controller 250 receives another touch input on the right side with respect to the first reference touch input, the controller 250 performs the function corresponding to the operation of clicking the right button of the mouse. In comparison, in case where the inversion signal is received, when the controller 250 receives another touch input on the left side with respect to the first reference touch input, the controller 250 performs the function corresponding to the operation of clicking the right button of the mouse and when the controller 250 receives another touch input on the right side with respect to the first reference touch input, the controller 250 performs the function corresponding to the operation of clicking the left button of the mouse.

The controller 250 receives the first touch input from the user through the touch sensor unit 221 and sets the first touch input as the first reference touch input, in step 510. The controller 250 determines whether the touch input is received in the first direction relative to the first reference touch input while the first reference touch input is being received, in step 520.

When the controller 250 determines that the touch input is received in the first direction relative to the first reference touch input while the first reference touch input is being received, the controller 250 performs the second function, differently from the embodiment of FIG. 3, in step 530. When the controller 250 determines that the touch input is not received in the first direction relative to the first reference touch input while the first reference touch input is being received, the controller 250 determines whether the touch input is received in the second direction opposite to the first direction while the first reference touch input is being received, in step 540. When the controller 250 determines that the touch input is received in the second direction while the first reference touch input is being received, the controller 250 performs the second function, differently from the embodiment of FIG. 3, in step 550.

Thus, switching a function corresponding to each direction according to an input of the inversion signal is for a left handed user. The left handed user may use the mouse function more easily and conveniently by inputting the inversion signal through the touch sensor unit 221 or the key input unit 230.

Figure 6:
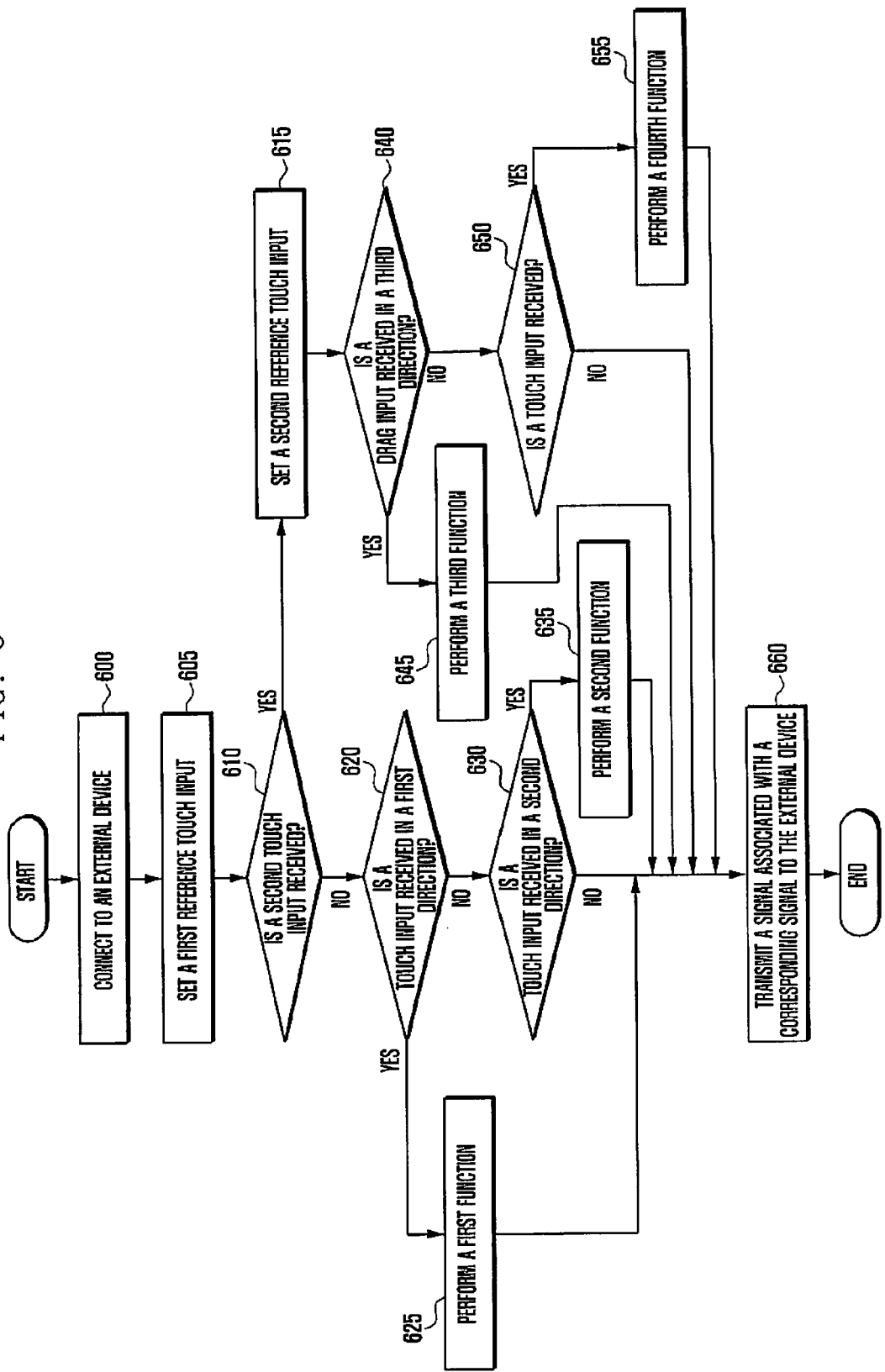
FIG. 6 is a flow chart illustrating a method of providing a mouse function using a terminal that includes a touch screen, according to a further embodiment of the present invention.

FIG. 6 is a flow chart illustrating a method of providing a mouse function using a terminal that includes a touch screen, according to another embodiment of the present invention.

The embodiment of FIG. 6 is substantially the same as the embodiment of FIG. 4, except for steps 600 and 660. Specifically, steps 605, 610, 615, 620, 625, 630, 635, 640, 645, 650 and 655 of FIG. 6 respectively mirror steps 405, 410, 415, 420, 425, 430, 435, 440, 445, 450 and 455 of FIG. 4. Therefore, the description of steps 600 and 660 are provided in detail below.

The controller 250 connects the terminal 200 to the external device through the communication unit 210, in step 600. As in the embodiment of FIG. 3, when performing one or more functions among the first function, the second function, the third function, or the fourth function corresponding to a user input, the controller 250 may transmit a signal associated with a corresponding function to the external device, in step 660. An example of such process is shown in FIG. 13.

FIG. 13 is a diagram illustrating a method of using a terminal connected to an external device, according to an embodiment of the present invention. In FIG. 13, the terminal 200 is wire connected to the TV 1300, which is the external device. The user may perform web surfing by using the TV 1300 through the terminal 200 connected with the TV 1300.

As described above, the user may control the external device easily and conveniently by using the terminal 200 as the mouse.

According to an embodiment of the present invention, in a terminal including a touch screen, a user may use a function of a mouse button and a mouse wheel more conveniently and intuitively.

While the invention has been shown and described with reference to certain embodiments thereof, it will be understood by those skilled in the art that various changes in form and detail may be made therein without departing from the spirit and scope of the present invention, as defined by the appended claims.

What is claimed is:

1. A method of providing a function of a mouse using a terminal that includes a touch screen, the method comprising the steps of:
   receiving a first touch input and setting the first touch input as a first reference touch input while the first touch input is maintained;
   performing a first function, if a second touch input is received at a first location in a first direction relative to a coordinate of the first reference touch input while the first touch input is maintained; and
   performing a second function, if the second touch input is received at a second location in a second direction, which is opposite the first direction, relative to the coordinate of the first reference touch input while the first touch input is maintained,
   wherein, when an inversion signal for a left-handed user is received prior to setting the first touch input as the first reference touch input:
       performing the second function, when the second touch input is received at the first location in the first direction relative to the coordinate of the first reference touch input while the first touch input is maintained; and
       performing the first function, when the second touch input is received at the second location in the second direction relative to the coordinate of the first reference touch input while the first touch input is maintained.

2. The method of claim 1, wherein:
   setting the first reference touch input comprises:
       determining whether the first touch input and the second touch input are received; and
       setting the first touch input and the second touch input as a second reference touch input while the first touch input and the second touch input are maintained; and
   the method further comprises:
       performing a third function, if a drag input is received between the first touch input and the second touch input in a third direction, which is perpendicular to the first direction and the second direction, while the first touch input and the second touch input are maintained.

3. The method of claim 2, further comprising:
   performing a fourth function, if a third touch input is received between the first touch input and the second touch input while the first touch input and the second touch input are maintained.

4. The method of claim 1, wherein:
   the first direction is a left direction relative to the coordinate of the first reference touch input, and the first function corresponds to an operation of clicking a left button of the mouse, and
   the second direction is a right direction relative to the coordinate of the first reference touch input, and the second function corresponds to an operation of clicking a right button of the mouse.

5. The method of claim 2, wherein the third function corresponds to an operation of rotating a mouse wheel.

6. The method of claim 3, wherein the fourth function corresponds to an operation of clicking a mouse wheel.

7. The method of claim 3, further comprising, prior to setting the first reference touch input:
   connecting the terminal to an external device; and
   when performing one or more functions among the first function, the second function, the third function, and the fourth function, transmitting a signal associated with corresponding performed one or more functions to the external device.

8. An apparatus for providing a function of a mouse using a terminal that includes a touch screen, the apparatus comprising:
   an input unit configured to receive touch inputs; and
   a controller configured to receive a first touch input and set the first touch input as a first reference touch input while the first touch input is maintained, configured to perform a first function if a second touch input is received at a first location in a first direction relative to a coordinate of the first reference touch input while the first touch input is maintained, and configured to perform a second function if the second touch input is received at a second location in a second direction, which is opposite the first direction, relative to the coordinate of the first reference touch input while the first touch input is maintained,
   wherein the controller is configured to receive an inversion signal for a left-handed user, configured to perform the second function if the second touch input is received at the first location in the first direction relative to the coordinate of the first reference touch input while the first touch input is maintained, and configured to perform the first function when the second touch input is received at the second location in the second direction relative to the coordinate of the first reference touch input while the first touch input is maintained.

9. The apparatus of claim 8, wherein:
   the controller is configured to determine whether the first touch input and the second touch input are received, and configured to set the first touch input and the second touch input as a second reference touch input, while the first touch input and the second touch input are maintained, and
   the controller is configured to perform a third function if a drag input is received between the first touch input and the second touch input in a third direction, which is perpendicular to the first direction and the second direction, while the first touch input and the second touch input are maintained.

10. The apparatus of claim 9, wherein the controller is configured to perform a fourth function if a third touch input is received between the first touch input and the second touch input while the first touch input and the second touch input are maintained.

11. The apparatus of claim 8, wherein:
    the first direction is a left direction relative to the coordinate of the first reference touch input, and the first function corresponds to an operation of clicking a left button of the mouse, and
    the second direction is a right direction relative to the coordinate of the first reference touch input, and the second function corresponds to an operation of clicking a right button of the mouse.

12. The apparatus of claim 9, wherein the third function corresponds to an operation of rotating a mouse wheel.

13. The apparatus of claim 10, wherein the fourth function corresponds to an operation of clicking a mouse wheel.

* * * * *